United States Patent [19]

Tanzer

[11] Patent Number: 4,830,097

[45] Date of Patent: May 16, 1989

[54] SPACE VEHICLE THERMAL REJECTION SYSTEM

[75] Inventor: Herbert J. Tanzer, Topanga, Calif.

[73] Assignee: The United States of America as represented by the Administrator of the National Aeronautics and Space Administration, Washington, D.C.

[21] Appl. No.: 73,539

[22] Filed: Jul. 15, 1987

[51] Int. Cl.$^4$ ............................................. F28D 15/02
[52] U.S. Cl. ................................. 165/41; 165/104.14; 165/104.26; 122/366
[58] Field of Search ...................... 165/104.14, 104.26, 165/41; 122/366

[56] References Cited

U.S. PATENT DOCUMENTS

| | | | |
|---|---|---|---|
| 3,450,195 | 6/1969 | Schnacke | 165/104.26 |
| 3,666,005 | 5/1972 | Moore, Jr. | |
| 4,231,423 | 11/1980 | Haslett | |
| 4,324,375 | 4/1982 | O'Neill | |
| 4,345,642 | 8/1982 | Ernst et al. | |
| 4,492,266 | 1/1985 | Bizzell et al. | 165/104.26 |
| 4,583,587 | 4/1986 | Alario et al. | |
| 4,602,679 | 7/1986 | Edelstein et al. | |
| 4,627,487 | 12/1986 | Basiulis | |
| 4,706,740 | 11/1987 | Mahefbey | 115/104.26 |

OTHER PUBLICATIONS

Tanzer, H. J., "High Capacity Honeycomb Panel Heat Pipes for Space Radiators", AIAA-83-1430, Jun. 1-3, 1983.
Alario J., Haslett, R. and Kosson, R., "The Monogroove High Performance Heat Pipe", AIAA-81-1156, Jun. 23-25, 1981.

Primary Examiner—Albert W. Davis, Jr.
Attorney, Agent, or Firm—Harold W. Adams; John R. Manning; Charles E. B. Glenn

[57] ABSTRACT

A space vehicle thermal heat rejection system 10 utilizing separate optimized heat pipe components for the functions of heat acquisition, heat transport, and heat rejection. A honeycomb panel heat pipe evaporator section 20 performs the function of heat acquisition, and forms a closed thermodynamic system with a dual channel heat pipe transport section 30, which performs the function of heat transport. A plurality of truss or channel core heat pipe rejection fins 41 form the condenser section 40, which performs the function of heat rejection. A common wall 32 separates the condenser section 40 from the transport section 30. Using the above heat pipe components and having efficient interfacing between them results in high performance factors for the overall system.

7 Claims, 5 Drawing Sheets

SPACE VEHICLE THERMAL REJECTION SYSTEM

ORIGINAL OF THE INVENTION

The invention described herein was made in the performance of work under a NASA Contract and is subject to the provisions of Section 305 of the National Aeronautics and Space Act of 1958, as amended, Public Law 85-568 (72 Stat. 435: 42 USC 2457).

BACKGROUND OF THE INVENTION

1. Field of the Invention

The present invention relates to a space vehicle thermal rejection system and more particularly to a space radiator utilizing separate heat pipe means.

2. Description of the Prior Art

Space vehicles are required to reject excess thermal energy to space. This requirement will continue to grow as future space systems get larger and have greater power. Space radiator systems are used in space thermal management systems for the functions of heat collection, heat transport, and heat rejection. The heat collection function includes interfacing with heat sources and transferring heat to the heat transport function. The heat transport function involves transmission of waste heat from the collection points to the rejection points. The heat rejection function uses space radiators for rejection of waste heat. Heat pipes, which are relatively simple devices that transport thermal energy by the evaporation, condensation, and return capillary flow of a two-phase working fluid, are useful in all three functions. This is because they provide high thermal conductivity in a self-contained, self-operating device without the need for valves, pumps, or compressors.

In a heat pipe, a working fluid circulates between heated and cooled regions to provide high thermal conductivity. In the heated region, called the "evaporator" section, thermal energy is transferred to the working fluid causing it to experience a phase change and become a vapor. This vapor then flows to the cooled region, called the "condenser" section, and becomes a liquid thereby releasing energy. The liquid is returned to the evaporator section by capillary action through a wick structure.

A planned United States Space Station will have high heat rejection loads. Two radiator concepts studied in the past to handle these loads are (1) the dual channel heat pipe attached to high efficiency fins, and (2) the honeycomb heat pipe. An example of the former is disclosed in U.S. Pat. No. 4,583,587 by Alario et al. It shows a monogroove heat pipe with a compact evaporator section, a condenser section encased in a heat radiating fin, separate channels for the axial transport of the liquid and vapor phases of the working medium, and a manifold that connects the evaporation section with the condensing section. Dual channel heat pipes generally have high heat transport capacity.

The honeycomb panel heat pipe concept has been studied as a space radiator. The concept has been described in AIAA paper 83-1430 (June 1983) entitled "High Capacity Honeycomb Panel Heat Pipes for Space Radiators". A honeycomb sandwich panel is used consisting of a wickable honeycomb core, internally wickable facesheets, and a working fluid. Evaporation of the working fluid occurs at any section of the panel exposed to heating. Vapor flows to a cooler region where it condenses, with the condensate returning to the evaporator by the capillary pumping action of the wick structure. Heat transfer is either from face-to-face, or in-plane along the faces.

The honeycomb panel heat pipe has good heat rejection performance, but limited heat transport capacity. The heat transport capacity can be improved by adding an external liquid sideflow, which is an external channel connected to the main vapor space via crossover connections. The sideflow offers low resistance to liquid flow in the direction of heat transfer, thus increasing the thermal transport that can be sustained by the pumping capillary forces. However, the increased heat transport capacity still does not match that of the dual channel heat pipe. Therefore, one way to optimize performance factors of a space radiator is to couple a high transport dual channel heat pipe, such as the monogroove, to a low transport radiating fin, such as the honeycomb heat-pipe panel. One disadvantage of doing this is the relatively high thermal resistance between the interfaces.

OBJECTS OF THE INVENTION

It is an object of this invention to improve the performance factors of thermal transport, thermal efficiency, and weight of a heat pipe based space thermal rejection system by individually optimizing each component, and providing efficient interfacing between them.

Other objects and advantages of this invention will become apparent hereinafter in the specification and drawings which follow.

SUMMARY OF THE INVENTION

According to the present invention, the foregoing and additional objects are obtained by providing a space vehicle thermal rejection system utilizing separate heat pipe means as an evaporator section, a transport section, and a condenser section for the functions of heat acquisition, heat transport, and heat rejection.

DESCRIPTION OF THE PREFERRED EMBODIMENT

Figure 1:
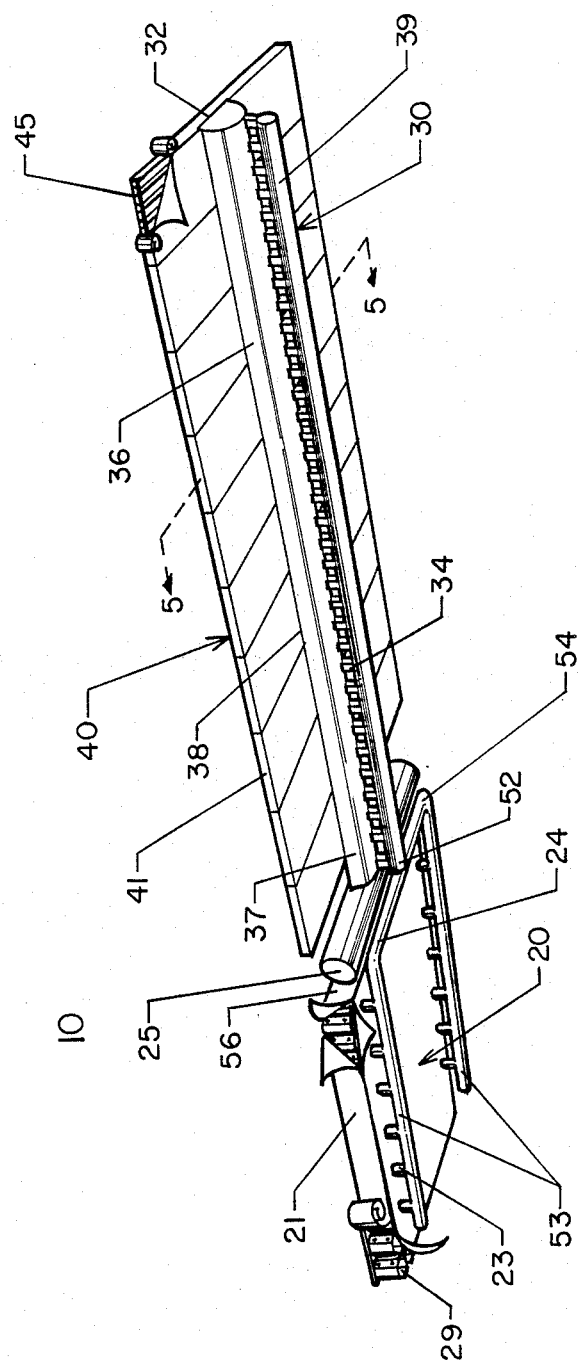
FIG. 1 illustrates a Space Vehicle Thermal Rejection System in accordance with the principles of the invention as generally including an evaporator section, a transport section, and a condenser section, operatively connected to form the system.

As shown in FIG. 1, a space vehicle thermal rejection system in accordance with the principles of the invention includes a heat pipe that serves as an evaporator section 20, a heat pipe that serves as a transport section 30, and a heat pipe system that serves as a condenser section 40 operatively connected to form the system.

Figure 2:
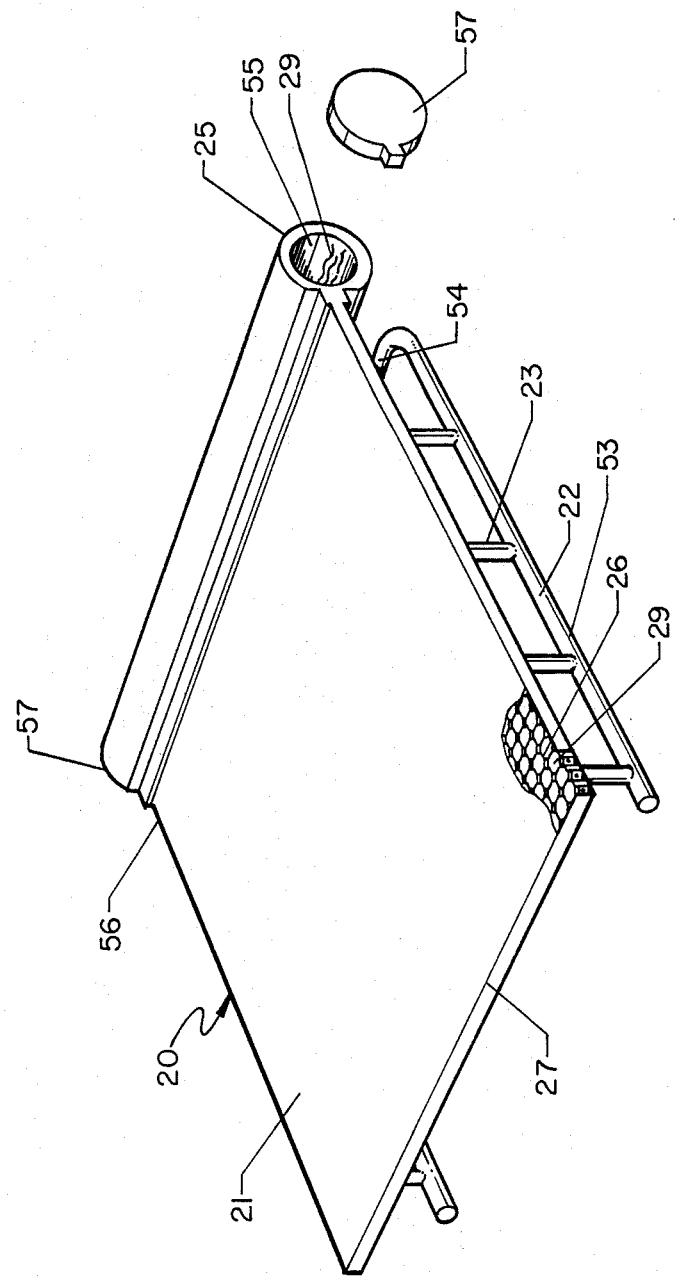
FIG. 2 is a perspective view of the evaporator section shown in FIG. 1.

As shown in FIG. 2, the heat pipe forming 20 maybe evaporator section of a stainless steel honeycomb panel structure as described in AIAA Paper 83-1430 (June 1983) entitled "High Capacity Honeycomb Panel Heat Pipes for Space Radiators". Two cylindrical sideflow channels 22 are formed in spaced and parallel tubes 53 that depend from and are secured to the honeycomb panel 21 of the heat pipe forming evaporator section 20 by means of a plurality of spaced cross-over tubes 23 that also provide passages connecting the sideflow channels 22 and the honeycomb panel 21.

The spaced and parallel tubes 53 are interconnected at the same opposing end by means of a third tube 54 which includes a channel that interconnects the sideflow channels 22 to form a single liquid header 24.

A cylindrical vapor header 25 providing a vapor collection chamber 55 therein is attached over and along the entire open end 56 of the honeycomb panel 21 of the heat pipe 20. The ends of the vapor header 25 may be integrally formed thereon or sealed by caps 57.

Figure 3:
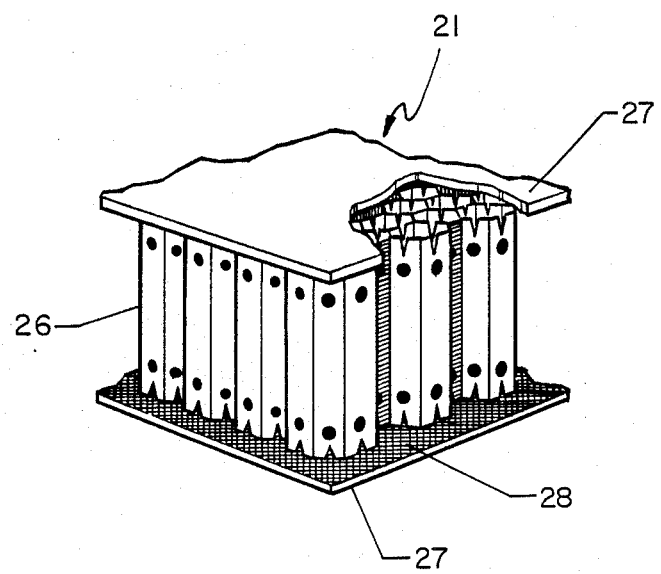
FIG. 3 is a detailed cutaway view illustrating the honeycomb sandwich panel structure of the evaporator section shown in FIG. 2.

The physical dimensions of the heat pipe 20, liquid header 24, and vapor header 25 are selected to achieve the desired amount of heat rejection from the space vehicle. As can be seen, the heat pipe forming evaporator section 20 of this invention, while of generally known construction, operates solely as an evaporator and not as a combined evaporator/condenser as is known. The operation solely as an evaporator as in this system is believed unique and permits a higher heat flux level within the system. Details of this construction are shown in FIG. 3.

The wickable honeycomb cells 26 are notched to allow liquid flow and perforated to permit vapor flow between cells as is known. A fine pore metal screen 28 is sintered to the internal side of the facesheets 27 to allow the desired capillary flow of a working fluid 29.

Referring again to FIGS. 1 and 4, the heat pipe 30 forming the transport section may be of the type described in AIAA Paper 81-1156 (June 1981) entitled "The Monogroove High Performance Heat Pipe".

Heat pipe 30 provides a semicircular vapor channel 31 that is formed by an elongated and curved sidewall 36 attached at one end 37 to the vapor header 25. The elongated sidewall 36 is attached at and along its opposite edges 38 to a common wall section 32 that extends the length of the sidewall 36 and between the vapor channel 31 and heat pipe system 40 that serves as the condenser section as will more fully be hereinafter explained.

Heat pipe 30 also provides a cylindrical liquid return channel 33 formed in an elongated tubular member 39 that extends below and parallel to the elongated sidewall 36, and is attached at one end 52 to the tube 54 that forms the liquid header 24. The tubular member 39 is secured to the side wall 36 by means of a plurality of spaced cross-over tubes 34 that interconnect the vapor channel 31 with the liquid header 24 through the liquid return channel 33.

The curved sidewall 36 forming the vapor channel 31, cross-over tubes 34, and tubular member 39 forming the liquid return channel 33 are made of stainless steel to withstand the pressures of a high latent heat of vaporization working fluid 29 such as ammonia, which the heat pipe 30 forming the transport section shares with the heat pipe 20 forming the evaporator section.

The use of a relatively wide and elongated common wall 32 provides an enlarged surface area allowing for a more efficient transfer of thermal energy from the vapor channel 31 to the heat pipe system that forms the condenser section 40. Due to the resulting lower thermal resistance, the temperature gradient across the common wall 32 interface can be further lowered by flattening the vapor channel 31 to increase the distance between opposing edges 38 and thus the effective heat transfer area. Also, elongated and parallel grooves 35 (FIG. 4) may be formed in the common wall 32 to increase the thermal transfer surface area.

The heat pipe system forming the condenser section 40 is shown in FIG. 1 to generally comprise a plurality of separate generally known truss or channel core heat pipe rejection fins 41 structurally connected along the length of the transport section 30. The heat pipe rejection fins 41 of the heat pipe system forming condenser section 40 structurally and thermally interface with the vapor channel 31 via the common wall 32.

Figure 4:
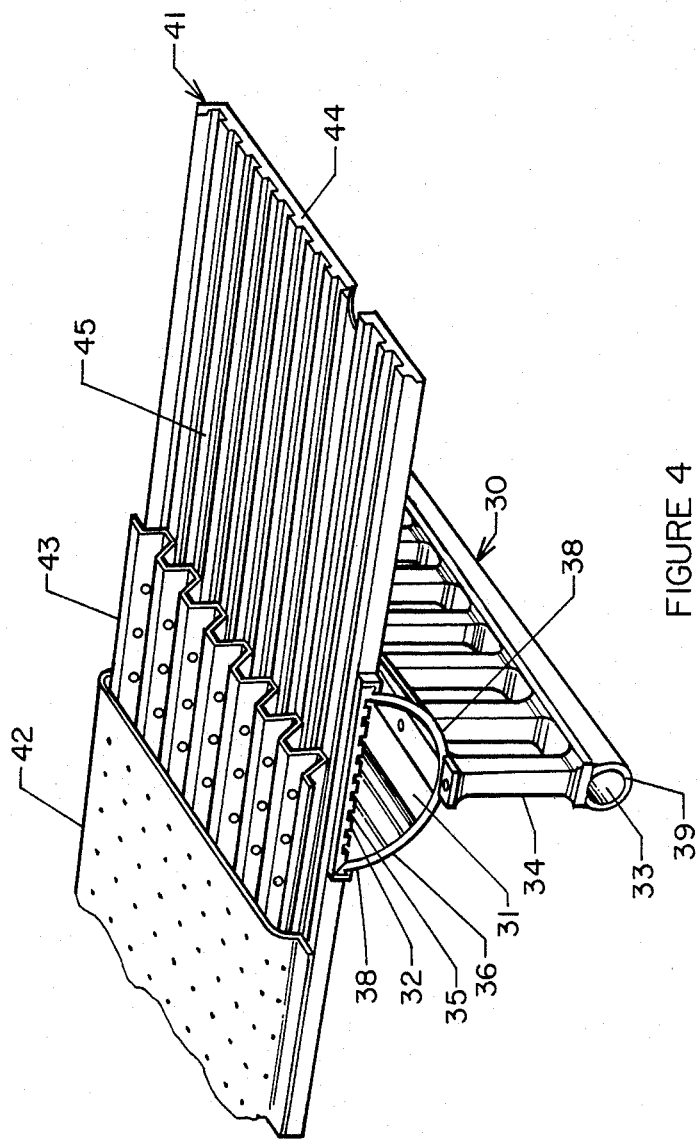
FIG. 4 is a detailed cutaway view of a portion of the transport section and a heat pipe rejection fin of the condenser section both of which are shown in FIG. 1.

FIG. 4 shows details of a channel core heat pipe rejection fin 41 with aluminum facesheets 42 surrounding an aluminum channel core 43. Grooves 44 provide low-resistant flow paths for liquid return. The use of aluminum or the like reduces the overall weight of the invention 10, and is compatible with a low pressure working fluid 45 such as acetone.

The efficiency of a radiator fin may be defined as the ratio of actual heat transfer from the fin to a maximum heat transfer that would be obtained if the entire fin were maintained at the same temperature as the heat input base area. The heat pipe rejection fins 41 have an across the panel temperature gradient of essentially zero, therefore making the fin efficiency approach 1.0.

Since each heat pipe rejection fin 41 is a separate thermodynamic system, damage from micrometeoroid penetration of one heat pipe rejection fin 41 effects only that unit and not the entire heat pipe system forming condenser section 40. Additionally, it has been found that tee puncture of a heat pipe rejection fin 41 only reduces fin efficiency to approximately 0.8.

The invention operates as follows. Thermal energy to be rejected from a space vehicle is transferred to the heat pipe forming the evaporator section 20 by a dry interface between the honeycomb panel 21 and the space vehicle thermal bus heat exchanger (not shown). Thereafter, two closed thermodynamic systems operate to dissipate this heat.

The first thermodynamic system, described more fully below, is the combination of the heat pipe 20 and the heat pipe forming evaporator section 30 which share the high latent heat of vaporization working fluid 29. The second thermodynamic system is the combination of heat pipe rejection fins 41 of the heat pipe system forming the condenser section 40.

The thermal energy transferred to the heat pipe forming evaporator section 20 from the spacecraft thermal bus heat exchanger causes the working fluid 29 in the honeycomb panel 21 to change phase from a liquid to a vapor. The resulting vapor flows through the honeycomb panel 21 to the vapor header 25 from which it flows into the vapor channel 31 of the heat pipe 30.

Figure 5:
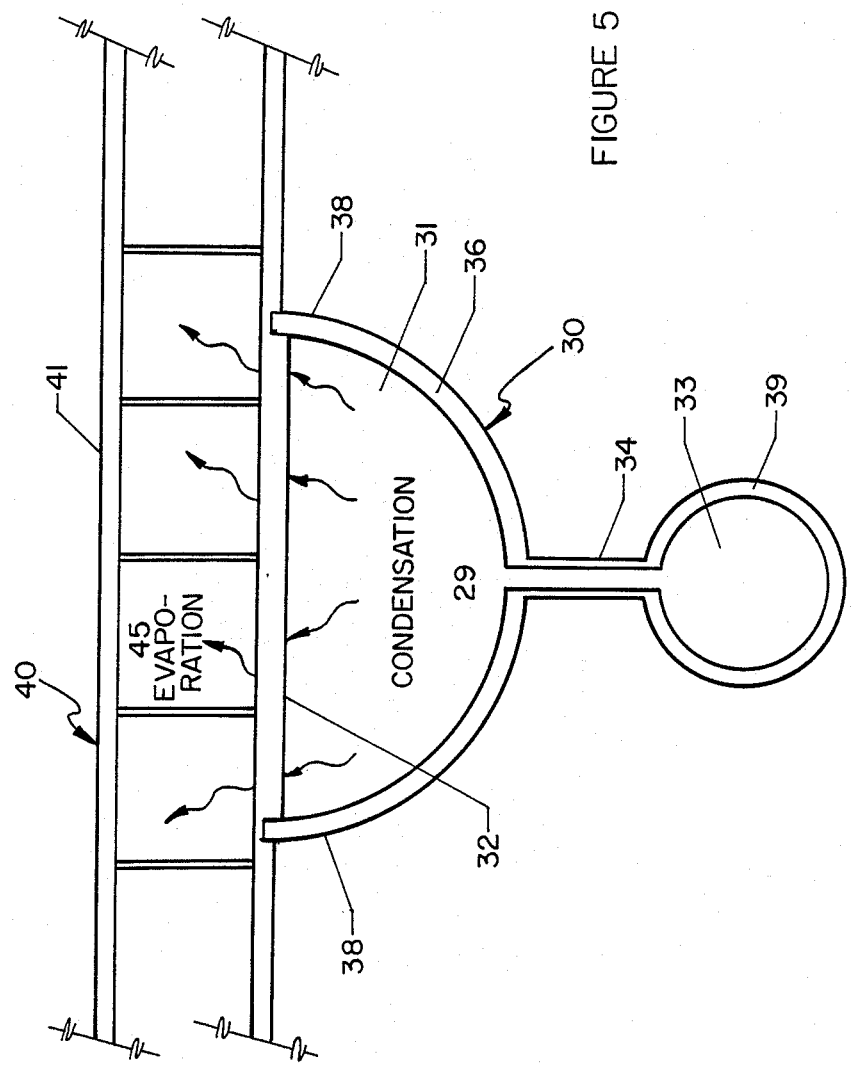
FIG. 5 is an enlarged partial cross-sectional view taken along line 5—5 of FIG. 1 illustrating a transport section and a condenser section in greater detail.

Referring now to FIG. 5, the interface between the vapor channel 31 and the heat pipe rejection fins 41 of the heat pipe system forming condenser section 40, via the common wall 32, is such that a low pressure working fluid 45, such as acetone, within the heat pipe rejection fins 41 evaporates as the vapor within the vapor channel 31 condenses. The condensed working fluid 29 within the vapor channel 31 flows through the cross-over tubes 34 by capillary action into the liquid return channel 33, eventually returning to the honeycomb panel 21 via the liquid header 24, sideflow channels 22, and interconnecting channels 23.

Although a preferred embodiment of the invention has been described in detail, it should be recognized that numerous modifications, substitutions, and changes may be made to the space vehicle thermal rejection system 10 without departing from the spirit hereof.

What is claimed as new and desired to the secured by Letters Patent of the United States is:

1. A thermal rejection system for a space vehicle comprising:
    a first heat pipe having evaporator means for acquiring thermal energy to be rejected from a thermal bus heat exchanger of said space vehicle by the vaporization of a working fluid within said first heat pipe and having condenser means for transporting said working fluid from said evaporator means as a vapor and returning said working fluid to said evaporator means as a liquid;
    a second heat pipe attached to and in thermal conduction with said condenser means for acquiring the rejected thermal energy in said vaporized working fluid in said condenser means, by the vaporization of a second working fluid within said second heat pipe, said second heat pipe providing a surface radiating said rejected thermal energy from said second heat pipe;
    said evaporator means comprising:
    a honeycomb panel for attachment to said thermal bus heat exchanger;
    a vapor header for receiving said first vaporized working fluid before said first vaporized working fluid enters said evaporator means; and
    a liquid header wherein said first liquid working fluid returned from said evaporator means converges before entering said honeycomb panel.

2. The invention as defined in claim 1 wherein said condenser means comprises:
    a dual channel heat pipe portion with high heat transport capacity;
    said dual channel heat pipe portion including an elongated vapor channel in fluid communication with said vapor header, and in thermal communication with said second heat pipe via a common wall;
    said dual channel heat pipe portion further including a liquid return channel in fluid communication with said vapor channel and said liquid header.

3. The invention as defined in claim 2 wherein said second heat pipe comprises:
    at least one grooved panel heat pipe fin;
    said grooved panel heat pipe fin thermally communicating with said condenser means via said common wall and said second working fluid confined within said second heat pipe.

4. The invention as defined in claim 1 wherein said honeycomb panel comprises:
    spaced facesheets and wickable honeycomb cells in fluid communication with said vapor header;
    said honeycomb cells provided with notches permitting liquid flow and provided with perforations permitting vapor flow between cells;
    said honeycomb panel including fine pore metal screen sintered to the internal side of each said facesheet; and
    a depending sideflow channel in fluid communication with said liquid header and connected to said honeycomb panel by means of cross-over tubes.

5. The invention as defined in claim 2 wherein said dual channel heat pipe portion includes:
    a partially flattened, semi-circular sidewall forming said vapor channel;
    parallel grooves disposed in said vapor channel and formed in said common wall; and
    cross-over tubes connecting said vapor channel to said liquid return channel to provide said means to collect liquid formed in said vapor channel.

6. The invention as defined in claim 3 wherein said second heat pipe includes a plurality of separate grooved panel heat pipe fins.

7. The invention as defined in claim 3 wherein said grooved panel heat pipe fin uses a low pressure working fluid.

* * * * *